(12) United States Patent
Nishino (10) Patent No.: US 9,035,806 B2
(45) Date of Patent: May 19, 2015

(54) KEYBOARD

(75) Inventor: Takeshi Nishino, Shinagawa (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 1178 days.

(21) Appl. No.: 12/505,567

(22) Filed: Jul. 20, 2009

(65) Prior Publication Data

US 2010/0123606 A1  May 20, 2010

(30) Foreign Application Priority Data

Nov. 14, 2008 (JP) ................................. 2008-292451

(51) Int. Cl.
*H03K 17/94* (2006.01)
*H01H 13/83* (2006.01)
*G06F 3/02* (2006.01)

(52) U.S. Cl.
CPC ............. *H01H 13/83* (2013.01); *G06F 3/0202* (2013.01); *H01H 2219/014* (2013.01); *H01H 2219/039* (2013.01); *H01H 2219/044* (2013.01); *H01H 2219/06* (2013.01)

(58) Field of Classification Search
CPC .................................................. G06F 1/1626
USPC ................................ 341/20–23; 200/314, 344
See application file for complete search history.

(56) References Cited

U.S. PATENT DOCUMENTS

| | | | | |
|---|---|---|---|---|
| 5,515,045 A * | 5/1996 | Tak | ................................ | 341/23 |
| 5,786,811 A * | 7/1998 | Jaeger | ........................... | 345/172 |
| 5,936,554 A * | 8/1999 | Stanek | ............................ | 341/22 |
| 6,797,902 B2 * | 9/2004 | Farage et al. | ................. | 200/314 |
| 6,798,359 B1 * | 9/2004 | Ivancic | ........................... | 341/23 |
| 6,834,294 B1 * | 12/2004 | Katz | ............................. | 709/203 |
| 7,027,037 B2 * | 4/2006 | Dowd | ........................... | 345/170 |
| 7,071,845 B2 * | 7/2006 | Ivancic | ........................... | 341/23 |
| 7,477,239 B2 * | 1/2009 | Ray | ................................ | 345/172 |
| 2003/0174072 A1 * | 9/2003 | Salomon | ......................... | 341/22 |
| 2003/0221944 A1 * | 12/2003 | Arai et al. | ..................... | 200/512 |
| 2005/0024340 A1 * | 2/2005 | Bathiche | ....................... | 345/170 |
| 2005/0231395 A1 * | 10/2005 | Shipman | ......................... | 341/22 |
| 2006/0139905 A1 * | 6/2006 | Kao et al. | ......................... | 362/23 |
| 2008/0001787 A1 * | 1/2008 | Smith et al. | ..................... | 341/23 |
| 2008/0135392 A1 * | 6/2008 | Huang et al. | .................. | 200/5 A |
| 2008/0143560 A1 * | 6/2008 | Shipman | ......................... | 341/22 |
| 2008/0309842 A1 * | 12/2008 | Kim | ................................ | 349/58 |
| 2009/0067153 A1 * | 3/2009 | Takeda et al. | ................... | 362/85 |
| 2009/0091478 A1 * | 4/2009 | Chan et al. | ...................... | 341/22 |

FOREIGN PATENT DOCUMENTS

| | | |
|---|---|---|
| JP | 06-022017 | 1/1994 |
| JP | 2002-251937 | 9/2002 |
| JP | 2002-260478 | 9/2002 |
| JP | 2003-308752 | 10/2003 |
| JP | 2006-228635 | 8/2006 |
| JP | 2007-280810 | 10/2007 |
| JP | 2007-293339 | 11/2007 |

* cited by examiner

*Primary Examiner* — Amine Benlagsir
(74) *Attorney, Agent, or Firm* — IPUSA, PLLC (57) ABSTRACT

A keyboard includes a plurality of key tops having areas where light is transmitted; a gear link part provided below the key top and configured to vertically move the key top, a housing part provided below the key top, the housing part being configured to hold the gear link part; a rubber actuator configured to provide a reaction force based on vertical motion of the key top; a membrane sheet provided below the rubber actuator and having a contact, the contact being configured to open and close based on the vertical motion of the key top; a support panel provided below the membrane sheet, the support panel being configured to fix the gear link part with the housing part; a light guide plate provided below the support panel; and a light emitting diode configured to emit the light to a side surface of the light guide plate.

10 Claims, 10 Drawing Sheets

KEYBOARD

CROSS-REFERENCE TO RELATED APPLICATIONS

This patent application is based upon and claims the benefit of priority of Japanese Patent Application No. 2008-292451 filed on Nov. 14, 2008, the entire contents of which are incorporated herein by reference.

BACKGROUND OF THE INVENTION

1. Field of the Invention

The present invention generally relates to keyboards used for inputting operations of computer apparatuses. More specifically, the present invention relates to a keyboard having a light emitting function which can be operated even under dark environments.

2. Description of the Related Art

Conventionally, keyboards which can be operated even in dark environments have been developed.

A keyboard using EL (electroluminescence) elements is suggested in, for example, Japanese Laid-Open Patent Application Publication No. 2002-251937. In this keyboard, a character, a mark, or the like is printed on an upper surface of a key top. An elastic member and a link mechanism are provided at a lower part of the key top. A reinforcing plate and a membrane sheet having a contact point are provided under the elastic member and the link mechanism.

Light is irradiated from a rear side of the key top by the EL element provided at a lower part of the membrane sheet. The light is irradiated from the rear side of the key top so that the character, mark, or the like printed on the upper surface of the key top is brightly luminous. As a result of this, the character, the mark, or the like printed on the upper surface of the key top can be visually recognized even in a dark environment.

Keyboards having LEDs (light emitting diodes) and light guide plates are suggested in, for example, Japanese Laid-Open Patent Application Publication No. 6-22017 and Japanese Laid-open Patent Application Publication No. 2007-280810. While a lighting operating life of the EL element is approximately 3000 hours which is relatively short, it is possible to continuously use the LED for a long time. In these keyboards, characters or the like printed on the key tops are luminous.

However, in the keyboard suggested in Japanese Laid-Open Patent Application Publication No. 2002-251937, in addition to their being a problem of the lighting operating life of the EL element, an area is required where a driving electric source is arranged because a high voltage is used. Accordingly, the keyboard may be large so that the keyboard may be heavy.

Furthermore, in the keyboards described in Japanese Laid-Open Patent Application Publication No. 6-22017 and Japanese Laid-Open Patent Application Publication No. 2007-280810, light emitted by the corresponding LEDs is incident on side surfaces facing each other of the light guide plate. Accordingly, in order to obtain even and sufficient luminance, it is necessary to provide two boards or the like where the LEDs are arranged, left and right or up and down. Therefore, the keyboard may be large so that the keyboard may be heavy.

It is desirable that a key board used for the notebook type computer apparatus be as small as possible.

SUMMARY OF THE INVENTION

Accordingly, embodiments of the present invention may provide a novel and useful keyboard solving one or more of the problems discussed above.

More specifically, the embodiments of the present invention may provide a keyboard proper for a notebook type computer apparatus, the keyboard having a small size and a light weight, wherein each of the keys of the keyboard emits light.

Another aspect of the present invention may be to provide a keyboard used for an inputting operation of a computer apparatus, the keyboard including:

a plurality of key tops having areas where light is transmitted;

a gear link part provided below the key top, the gear link part being configured to vertically move the key top, a housing part provided below the key top, the housing part being configured to hold the gear link part;

a rubber actuator configured to provide a reaction force based on vertical motion of the key top;

a membrane sheet provided below the rubber actuator, the membrane sheet having a contact, the contact being configured to open and close based on the vertical motion of the key top;

a support panel provided below the membrane sheet, the support panel being configured to fix the gear link part with the housing part;

a light guide plate provided below the support panel; and a light emitting diode configured to emit the light to a side surface of the light guide plate;

wherein the light guide plate has a size the same as a size of the keyboard and is divided into plural divided light guide plate parts; and the light emitting diode is provided in a space between the light guide plate parts.

Another aspect of the present invention may be to provide a keyboard used for an inputting operation of a computer apparatus, the keyboard including:

a plurality of key tops having areas where light is transmitted;

a gear link part provided below the key top, the gear link part being configured to vertically move the key top, a housing part provided below the key top, the housing part being configured to hold the gear link part;

a rubber actuator configured to provide a reaction force based on vertical motion of the key top;

a membrane sheet provided below the rubber actuator, the membrane sheet having a contact, the contact being configured to open and close based on the vertical motion of the key top;

a support panel provided below the membrane sheet, the support panel being configured to fix the gear link part with the housing part; and a light emitting diode configured to emit the light to a side surface of a light guide plate;

wherein a lower part sheet of the membrane sheet is formed by the light guide plate;

the light from the light emitting diode is incident on a side surface of the lower part sheet;

the light guide plate has a size the same as a size of the keyboard and is divided into plural divided light guide plate parts; and the light emitting diode is provided in a space between the light guide plate parts.

According to the embodiments of the present invention, it is possible to provide a keyboard proper for a notebook type computer apparatus, the keyboard having a small size and a light weight, wherein each of keyboard keys emits light.

According to the embodiments of the present invention, it is possible to provide a contact member having good elasticity and being capable of reducing inductance, the contact member being capable of being arranged with a short pitch, and a connector including the contact member.

Additional objects and advantages of the embodiments are set forth in part in the description which follows, and in part will become obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to the FIG. 1 through FIG. 10 of embodiments of the present invention.

First Embodiment

Figure 1:
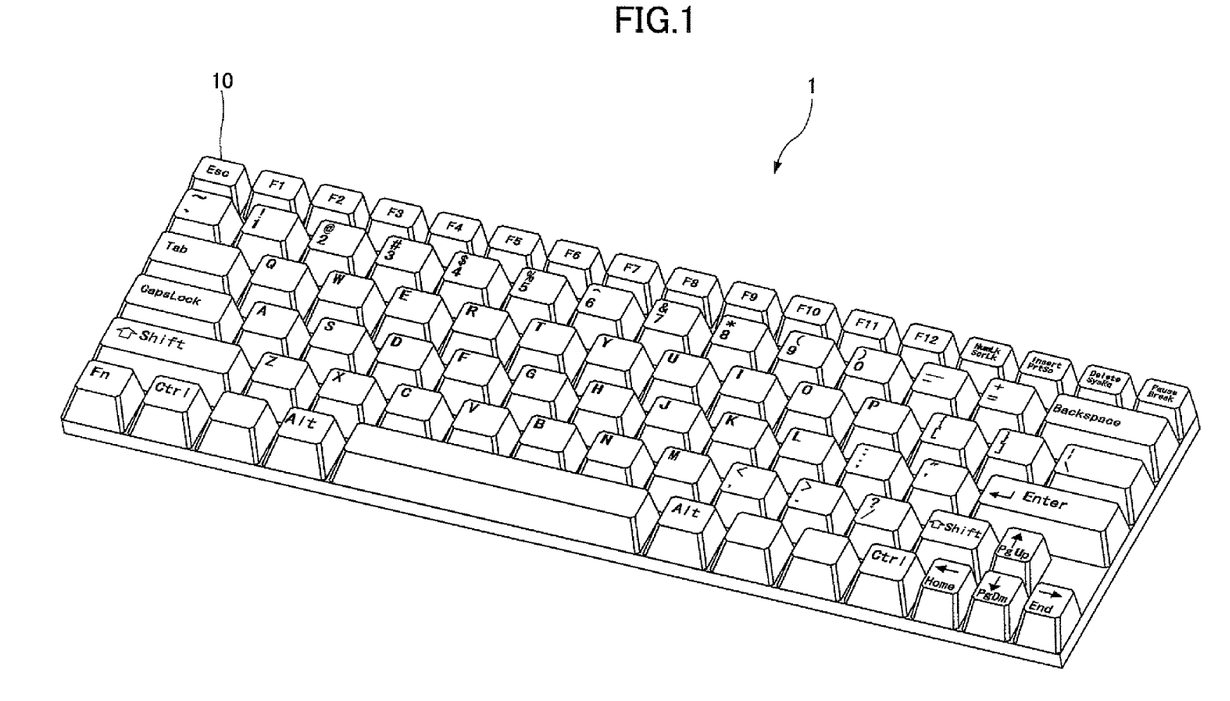
FIG. 1 is an entire view of the keys of a keyboard of a first embodiment of the present invention.
Figure 2:
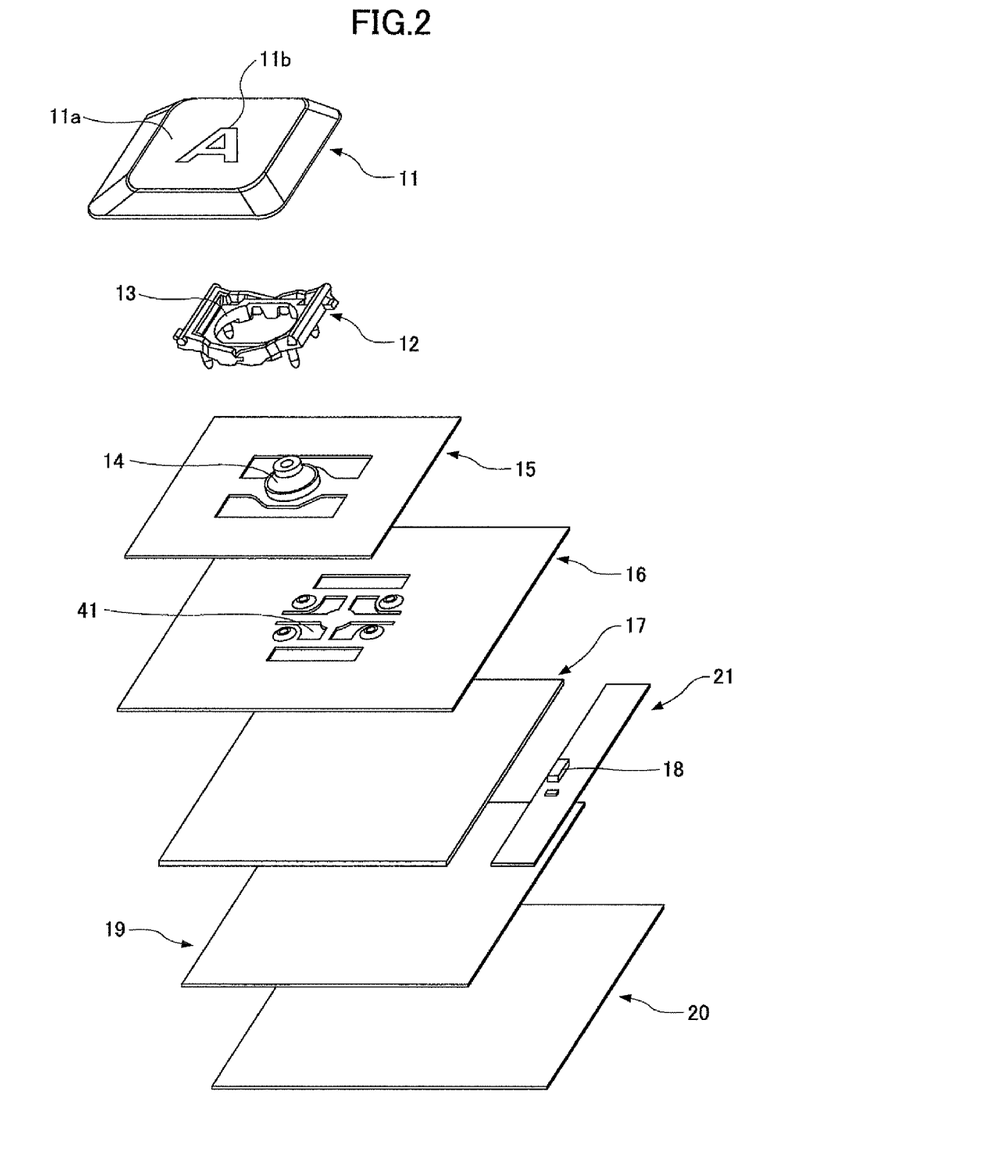
FIG. 2 is an exploded perspective view of a structure of the keyboard of the first embodiment of the present invention.

A structure of a keyboard 1 of the first embodiment of the present invention is discussed with reference to FIG. 1 and FIG. 2. Here, FIG. 1 is an entire view of keys 10 of the keyboard 1 of the first embodiment of the present invention. FIG. 2 is a perspective view of a structure of the keyboard 1 of the first embodiment of the present invention.

Plural keys 10 are arranged at a surface of the keyboard 1 of the first embodiment of the present invention.

As shown in FIG. 2, a key top 11 is provided at a surface of each of the keys 10, namely an operations surface. Based on vertical motion of the key top 11, a signal is input, via the keyboard 1, to a notebook type computer apparatus (not shown in FIG. 1 and FIG. 2) connected to the keyboard 1.

A gear link part 12 and a housing part 13 are provided below the key top 11. The gear link part 12 is configured to vertically move the key top 11. In addition, a rubber actuator 14 is provided below the key top 11. The rubber actuator 14 is configured to provide a reaction force based on the vertical motion of the key top 11.

The rubber actuator 14 is provided on a membrane sheet 15. A support panel 16 is provided below the membrane sheet 15. The support panel 16 is configured to fix the gear link part 12 with the housing part 13.

A light guide plate 17 is provided below the support panel 16. A light emitting diode 18 is provided at a side surface of the light guide plate 17. The light emitting diode 18 is configured to emit a light to be incident on the side surface of the light guide plate 17.

Furthermore, a reflection sheet 19 is provided below the light guide plate 17. The reflection sheet 19 is configured to reflect the light. A base plate 20 made of metal is provided below the reflection sheet 19. The light emitting diode 18 is mounted on a LED mounting FPC (flexible printed circuit board) 21.

The key top 11 includes a shading area 11a and a light transmission area 11b. The light transmission area 11b is formed by, for example, the following method. That is, first, a black shading paint is coated on a surface of a member made of transparent or translucent resin or the like. Then, a laser light is irradiated to only a part where the light is to be transmitted so that the light is emitted, and thereby the black shading paint is removed from this part and the transparent or translucent resin or the like is exposed in this part. As a result of this, the light transmission area 11b is formed. An area where the black shading paint remains is the shading area 11a.

The light transmission area 11b has a character or mark shaped configuration. The character or mark is made luminous by the light transmitted from a rear surface of the key top 11.

The key top 11 may be made by double molding of the transparent or translucent resin or resin where the light is not transmitted. More specifically, in this case, the shading area 11a is a member having a configuration of the key top 11, where a portion corresponding to the character, the mark, or the like is punched out, and made of the resin where the light is not transmitted. The portion corresponding to the character, the mark, or the like and being punched out is formed by the transparent or translucent resin so that the light transmission area 11b is formed. As a result of this, the key top 11 can be formed so that the light transmitted from the rear surface of the key top 11 can be irradiated from the character, the mark, or the like.

The gear link part 12 is provided below the key top 11. The gear link part 12 is configured to vertically move the key top 11. The gear link part 12 has a part configured to horizontally move based on the vertical motion of the key top 11. The gear link part 12 is made of transparent or translucent resin having a light transmission capability so that the light is transmitted through the gear link part 12.

The housing part 13 is configured to hold the gear link part 12. The gear link part 12 is fixed to the support panel 16 by the housing part 13. The housing part 13 is made of transparent or translucent resin having a light transmission capability so that the light is transmitted through the housing part 13.

The rubber actuator 14 is deformed based on the vertical motion of the key top 11. When the key top 11 is pushed, a reaction force for returning to an original state arises in the rubber actuator 14. This reaction force pushes up the key top 11 via the gear link part 12. Because of this, the rubber actuator 14 is made of transparent or translucent resin having elasticity and a light transmission capability so that the light is transmitted through the rubber actuator 14.

The membrane sheet 15 is provided below the rubber actuator 14. A contact for opening and closing in response to the vertical motion of the key top 11 is provided in the membrane sheet 15.

Figure 3:
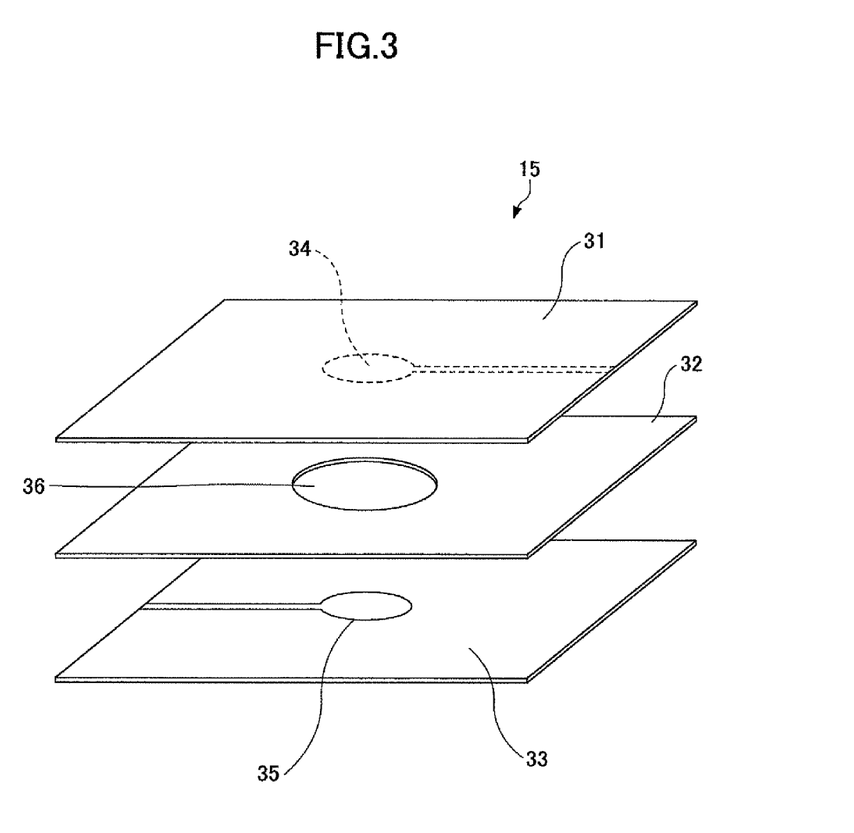
FIG. 3 is a structural perspective view of a membrane sheet of the keyboard of the first embodiment of the present invention.

FIG. 3 is a structural perspective view of the membrane sheet 15 of the keyboard 1 of the first embodiment of the present invention. As shown in FIG. 3, the membrane sheet 15 includes an upper part sheet 31, a spacer sheet 32, and a lower part sheet 33.

An electrode pattern 34 is formed on the upper part sheet 31. An electrode pattern 35 is formed on the lower part sheet 33.

Based on the vertical motion of the key top 11, the electrode pattern 34 and the electrode pattern 35 come in contact with each other via the gear link part 12 and the rubber actuator 14, and thereby a contact is formed. In other words, based on the vertical motion of the key top 11, the electrode pattern 34 formed on the upper part sheet 31 and the electrode pattern 35 formed on the lower part sheet 33 come in contact with each other at an opening part 36 of the spacer sheet 32. This forms the contact.

The upper sheet 31, the spacer sheet 32, and the lower part sheet 33 forming the membrane sheet 15 are made of transparent or translucent resin having a light transmission capability so that the light is transmitted through the membrane sheet 15. The electrode pattern 34 and the electrode pattern 35 are formed by transparent electrodes made of conductive polymer so that the light is transmitted through the electrode pattern 34 and the electrode pattern 35.

Referring back to FIG. 2, the support panel 16 is provided below the membrane sheet 15. The gear link part 12 is fixed to the support panel 16 by the housing part 13. The support panel 16 has a plate-shaped configuration made of metal. The support panel 16 has an opening part 41 so that the light is transmitted through the opening part 41.

The light guide plate 17 is provided below the support panel 16. The light emitting diode 18 is provided at the side surface of the light guide plate 17. The light emitted by the light emitting diode 18 enters from the side surface of the light guide plate 17 (light guide plate parts 17a, 17b) so as to expand inside the light guide plate 17 (light guide plate parts 17a, 17b).

Figure 4:
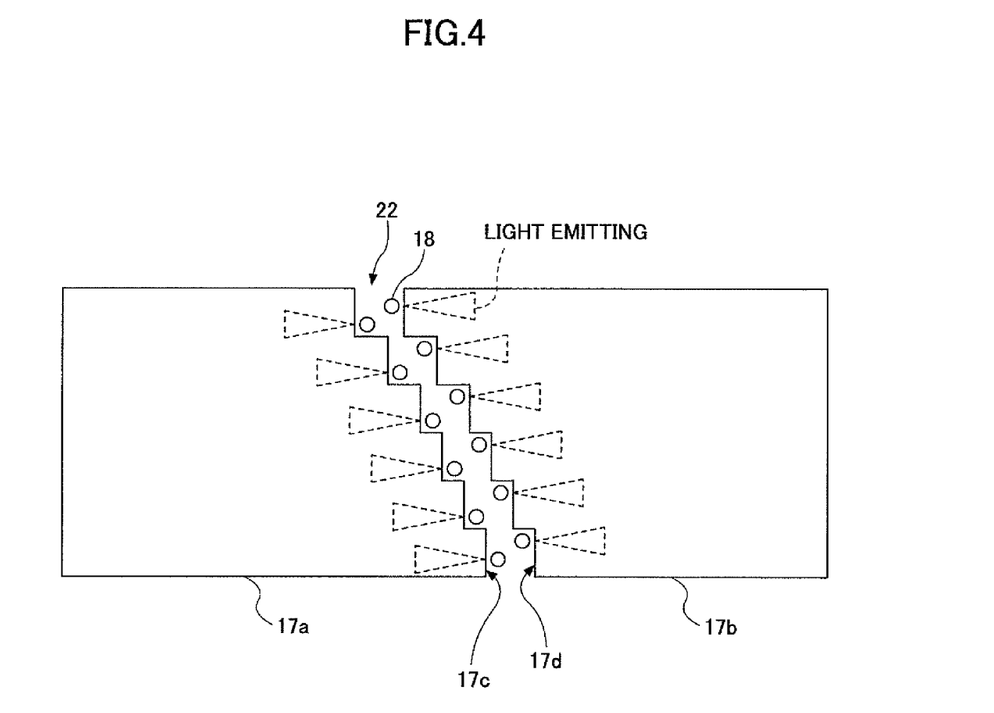
FIG. 4 is a structural view of a light guide plate of the keyboard of the first embodiment of the present invention.

FIG. 4 shows the arrangement of the light guide plate 17 and the light emitting diodes 18 in the keyboard 1 of the first embodiment of the present invention. As shown in FIG. 4, the light guide plate 17 (light guide plate parts 17a, 17b) of the keyboard 1 of the first embodiment of the present invention is divided into the two parts 17a and 17b having step parts 17c and 17d, respectively. Each of the step parts 17c and 17d has a stair-shaped configuration.

The divided light guide plate parts 17a and 17b are arranged with separation so as to face each other at the step parts 17c and 17d. In an area 22 between the divided light guide plate parts 17a and 17b, one or more light emitting diodes 18 are provided at the side surface of each of the step parts 17c and 17d of the divided light guide plate parts 17a and 17b, which side surfaces are in a short direction of the keyboard 1.

Since the light emitting diodes 18 are provided at each of the side surfaces of the step parts 17c and 17d, light beams from the light emitting diodes 18 expand as indicated by dotted lines. The light beams are not shaded by the step parts 17c and 17d so that the entirety of the light guide plate 17 (light guide plate parts 17a, 17b) transmits the light.

Figure 5:
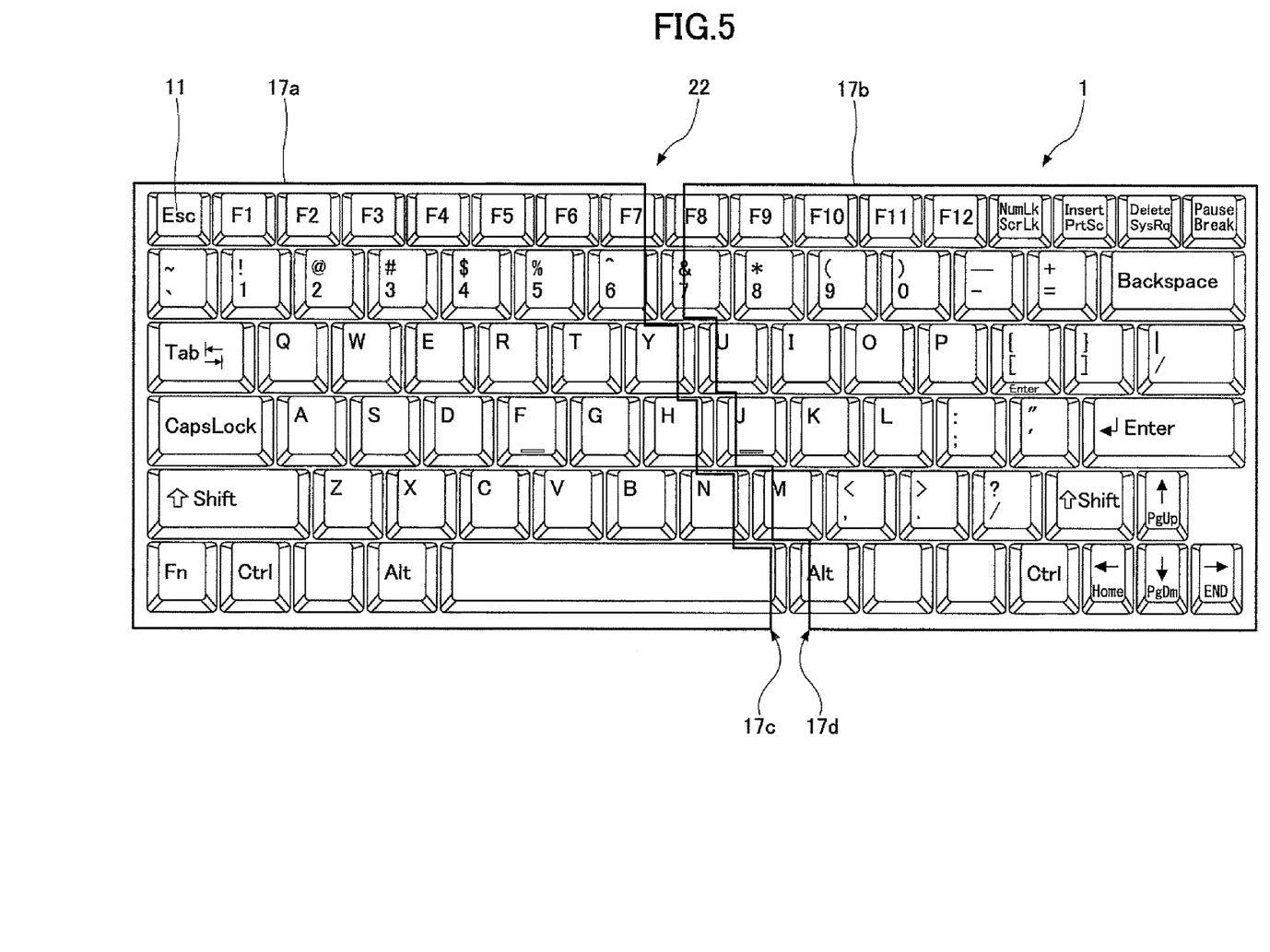
FIG. 5 is an arrangement view of the light guide plate of the keyboard of the first embodiment of the present invention.

FIG. 5 is an arrangement view of the light guide plate 17 of the keyboard 1 of the first embodiment of the present invention. It should be noted that illustration of the light emitting diodes is omitted.

As shown in FIG. 5, each of the step parts 17c and 17d of the divided light guide plate parts 17a and 17b has a configuration of a space between neighboring key tops 11 arranged in the keyboard 1. The divided light guide plate parts 17a and 17b are arranged so that the step parts 17c and 17d having the above-mentioned configurations face each other, and the area 22 between the divided light guide plate parts 17a and 17b is right below the space between the neighboring key tops 11.

The light emitting diodes 18 are arranged in the area 22 and thereby the light beams emitted from the light emitting diodes 18 can be evenly and brightly irradiated, via the light guide plate 17 (light guide plate parts 17a, 17b), to the light transmission areas 11b of the key tops 11 from the rear surfaces of the key tops 11. In order to evenly irradiate the entirety of key tops 11, it is proper to divide the light guide plate 17 and arrange the divided light guide plate parts 17a and 17b as discussed above.

Referring back to FIG. 2, the reflection sheet 19 is provided below the light guide plate 17. The light leaking from the light guide plate 17 is reflected by the reflection sheet 19 so that the light is transmitted in a surface direction of the light guide plate 17. Furthermore, the base plate 20 made of metal is provided below the reflection sheet 19.

Figure 6:
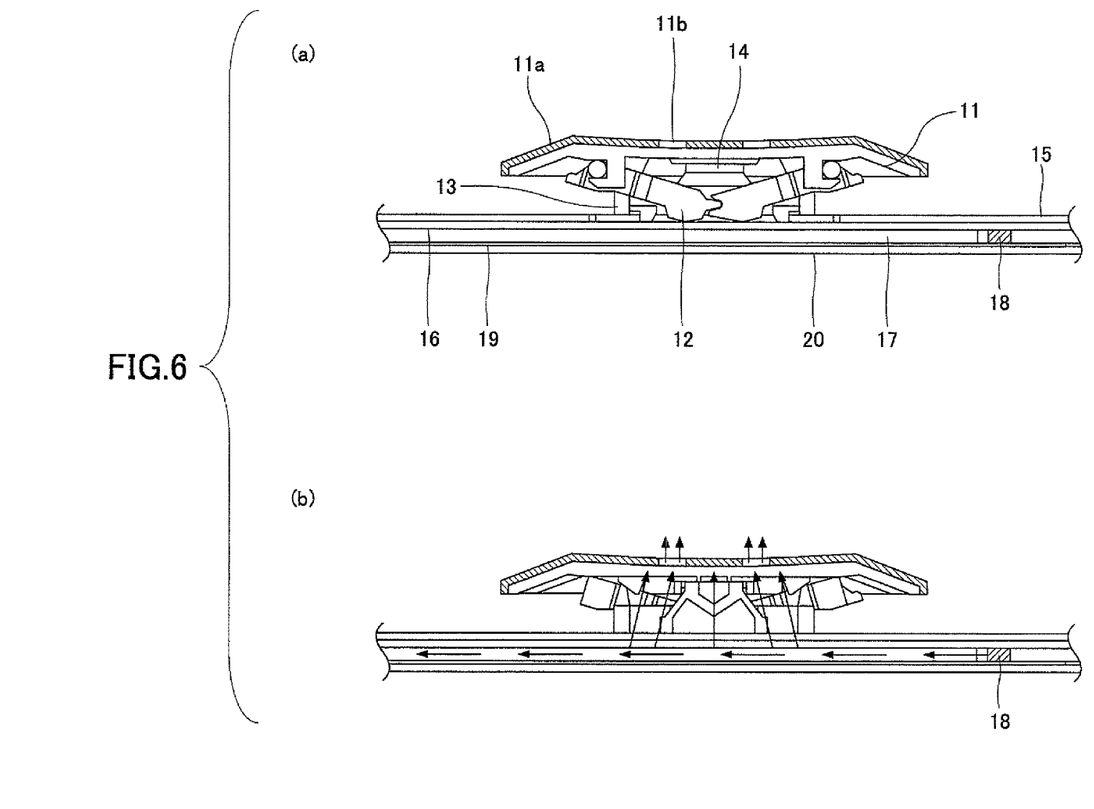
FIG. 6 is a view showing a light path of the keyboard of the first embodiment of the present invention.

Next, light emitting of the keyboard 1 of the first embodiment of the present invention is discussed with reference to FIG. 6(a) and FIG. 6(b).

FIG. 6(a) is a partial cross-sectional view of a part of the keyboard 1. FIG. 6(b) is a view for explaining a light emitting state of the keyboard 1 shown in FIG. 6(a).

In the keyboard 1 of the first embodiment of the present invention, the light emitting from the light emitting diode 18 is diffused in the light guide plate 17 in directions indicated by arrows in FIG. 6(b).

Since the reflection sheet 19 is provided at the rear surface of the light guide plate 17, the light diffused in the light guide plate 17 does not leak to the rear surface of the light guide plate 17. All of the light diffused in the light guide plate 17 is transmitted to the surface where the key tops 11 are provided so as to be emitted.

More specifically, the light transmitted from the light guide plate 17 is transmitted through the membrane sheet 15, the rubber actuator 14, the housing 13 and the gear link part 12 made of transparent or translucent resin. The light furthermore is transmitted through the light transmitting area 11b of the key top 11 so that the light transmitting area 11b is brightly luminous. Since the shading area 11a of the key top 11 is made of the shading resin or the like, the light is absorbed in the light shading area 11a and the light shading area 11a is not brightly luminous. The support panel 16 has the opening part 41 as shown in FIG. 2 and therefore the light passes through the opening part 41.

As discussed above, the keyboard 1 of the first embodiment of the present invention includes the divided light guide plate parts 17a and 17b. The light emitting diodes 18 as light sources are provided in the area 22 between the divided light guide plate parts 17a and 17b situated in the center part of the keyboard 11.

Accordingly, the entire keyboard is not large. Furthermore, a single LED mounting FPC 21 where the light emitting diodes 18 are mounted is sufficient. Hence, it is possible to manufacture the keyboard at low cost and make the keyboard light-weight.

Second Embodiment

Next, a second embodiment of the present invention is discussed. The second embodiment is different from the first embodiment in that a divided configuration of the light guide plate is different.

Figure 7:
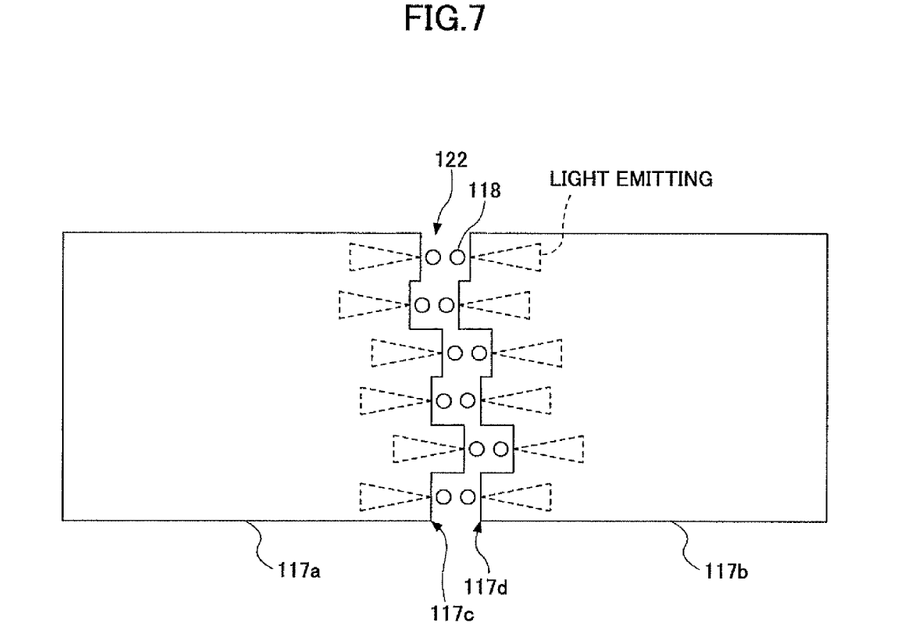
FIG. 7 is a structural view of a light guide plate of a keyboard of a second embodiment of the present invention.

FIG. 7 is a structural view of a light guide plate 117 of a keyboard 1 and light emitting diodes 118 of a second embodiment of the present invention. In the second embodiment, a light guide plate 117 (light guide plate parts 117a, 117b) of the keyboard 1 is divided, at a part near the center, into two parts having step parts 117c and 117d. The step parts 117c and 117d have configurations corresponding to spaces between neighboring key tops 11 arranged in the keyboard 1.

The divided light guide plate parts 117a and 117b are arranged with separation so as to face each other at the step parts 117c and 117d. In an area 122 between the divided light guide plate parts 117a and 117b, one or more light emitting diodes 118 are provided at the side surface of each of the step parts 117c and 117d of the divided light guide plate parts 117a and 117b, which side surfaces are in a short direction of the keyboard 1. Since the light emitting diodes 118 are provided at the corresponding side surfaces of the step parts 117c and 117d, the light beams from the light emitting diodes 118 expand as indicated by dotted lines. The light beams are not shaded by the step parts 117c and 117d so that the entirety of the light guide plate 117 (light guide plate parts 117a, 117b) transmits the light.

Figure 8:
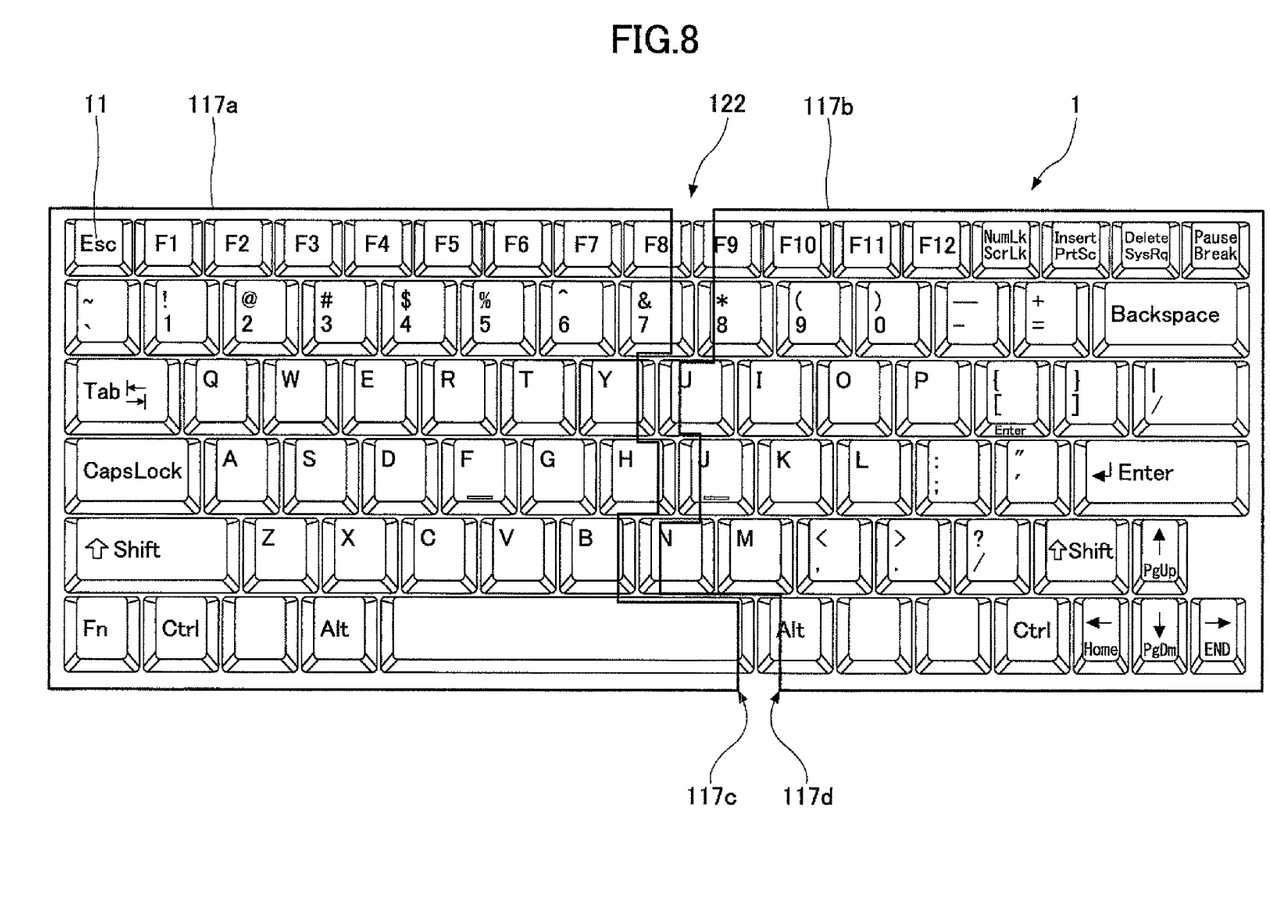
FIG. 8 is an arrangement view of the light guide plate of the keyboard of the second embodiment of the present invention.

FIG. 8 is an arrangement view of the light guide plate 117 of the keyboard 1 of the second embodiment of the present invention. It should be noted that illustration of the light emitting diodes 118 is omitted.

As shown in FIG. 8, each of the step parts 117c and 117d of the divided light guide plate parts 117a and 117b has a configuration of a space between neighboring key tops 111 arranged in the keyboard 1. The divided light guide plate parts 117a and 117b are arranged where the step parts 117c and 117d having the above-mentioned configurations face each other, so that the area 122 between the divided light guide plate parts 117a and 117b is right below the space between the neighboring key tops 11.

The light emitting diodes 118 are arranged in the area 122 and thereby the light beams emitted from the light emitting diodes 118 can be evenly and brightly irradiated, via the light guide plate 17 (light guide plate parts 17a, 17b), to the light transmission areas 11b of all key tops 11 from the rear surfaces of the key tops 11. In order to evenly irradiate the entirety of the key tops 11, it is proper to divide the light guide plate 117 and arrange the divided light guide plate parts 117a and 117b as discussed above.

In the second embodiment of the present invention, the light guide plate 117 is divided into two light guide plate parts 117a and 117b at a part near the center. Accordingly, it is possible to obtain the keyboard 1 having even brightness in upper and lower directions at left and right ends.

Other than this structure, the second embodiment is the same as the first embodiment.

Third Embodiment

Next, a third embodiment of the present invention is discussed. The third embodiment is different from the first embodiment in that a divided configuration of the light guide plate is different.

Figure 9:
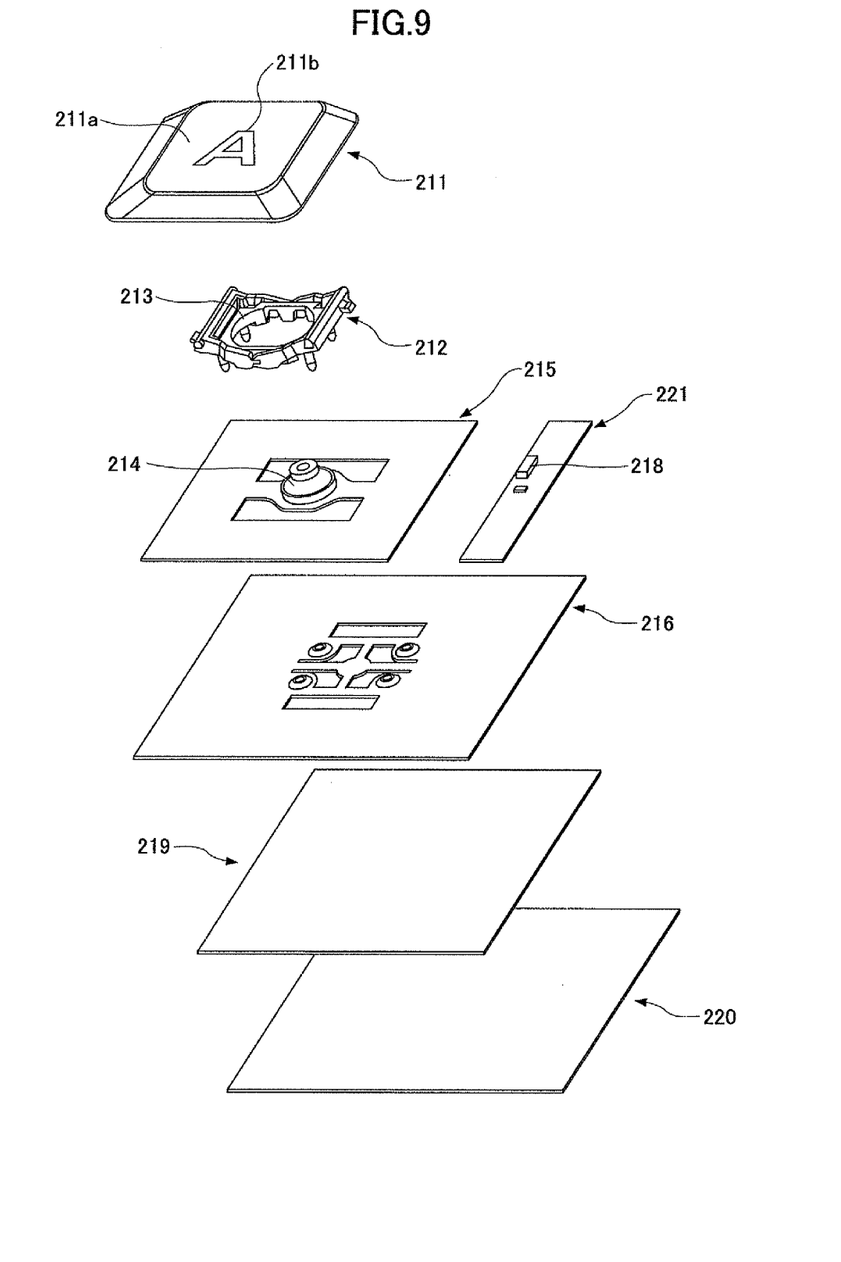
FIG. 9 is a structural exploded perspective view of a keyboard of a third embodiment of the present invention.
Figure 10:
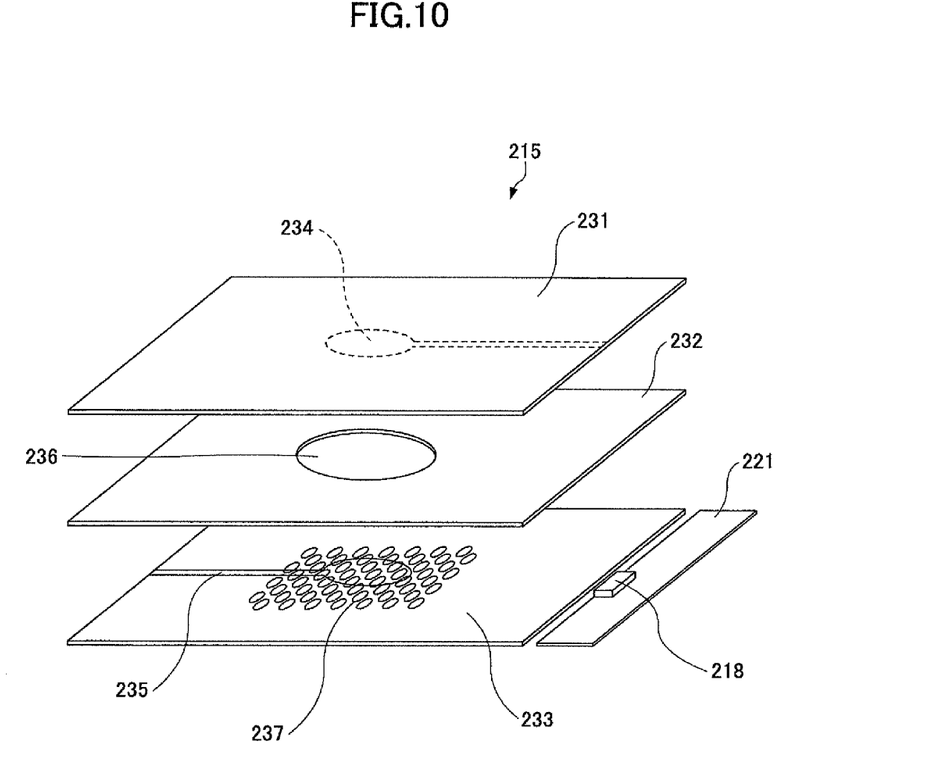
FIG. 10 is a structural view of a membrane sheet of the keyboard of the third embodiment of the present invention.

In the third embodiment, the lower sheet forming the membrane sheet also functions as a light guide plate. The third embodiment is discussed with reference to FIG. 9 and FIG. 10. FIG. 9 is a structural perspective view of a keyboard 1 of the third embodiment of the present invention. FIG. 10 is a structural view of a membrane sheet 215 of the keyboard 1 of the third embodiment of the present invention.

As shown in FIG. 9, a key top 211 is provided at a surface of each of the keys 10, namely an operations surface. Based on vertical motion of the key top 211, a signal is input, via the keyboard 1, to a notebook type computer apparatus (not shown in FIG. 9) connected to the keyboard 1.

A gear link part 212 and a housing part 213 are provided below the key top 211. The gear link part 212 is configured to vertically move the key top 211. In addition, a rubber actuator 214 is provided below the key top 211. The rubber actuator 214 is configured to provide a reaction force based on the vertical motion of the key top 211.

The rubber actuator 214 is provided on a membrane sheet 215. A support panel 216 is provided below the membrane sheet 215. The support panel 216 is configured to fix the gear link part 212 with the housing part 213.

Furthermore, a reflection sheet 219 is provided below the support panel 216. The reflection sheet 219 is configured to reflect the light. A base plate 220 made of metal is provided below the reflection sheet 219.

The key top 211 includes a shading area 211a and a light transmission area 211b. The light transmission area 211b is formed by, for example, the following method. First, a black shading paint is coated on a surface of a member made of transparent or translucent resin or the like. Then, a laser light is irradiated to only a part where the light is to be transmitted so that the light may be emitted, and thereby the black shading paint is removed from this part and the transparent or translucent resin or the like is exposed in this part. As a result of this, the light transmission area 211b is formed. An area where the black shading paint remains is the shading area 211a.

The light transmission area 211b has a character or mark shaped configuration. The character or mark is made luminous by the light transmitted from a rear surface of the key top 211.

In this embodiment, as well as the first embodiment, the key top 211 may be made of double molding of the transparent or translucent resin or resin where the light is not transmitted.

A contact for opening and closing in response to the vertical motion of the key top 211 is provided in the membrane sheet 215.

As shown in FIG. 10, the membrane sheet 215 includes an upper part sheet 231, a spacer sheet 232, and a lower part sheet 233. An electrode pattern 234 is formed on the upper part sheet 231. An electrode pattern 235 is formed on the lower part sheet 233.

Based on the vertical motion of the key top 211, the electrode pattern 234 and the electrode pattern 235 come in contact with each other via the gear link part 212 and the rubber actuator 214, and thereby a contact is formed. In other words, based on the vertical motion of the key top 211, the electrode pattern 234 formed on the upper part sheet 231 and the electrode pattern 235 formed on the lower part sheet 233 come in contact with each other at an opening part 236 of the spacer sheet 232. This forms the contact.

The lower part sheet 233 has a function as the light guide plate. A light emitting diode 218 is provided at a side surface of the lower part sheet 233. The light emitting diode 218 is configured to emit light to be incident on the side surface of the lower part sheet 233. The light emitting diode 218 is mounted on a LED mounting FPC (flexible printed circuit board) 221.

The upper sheet 231, the spacer sheet 232, and the lower part sheet 233 forming the membrane sheet 215 are made of transparent or translucent resin having a light transmission capability so that the light is transmitted through the membrane sheet 215. The electrode pattern 234 and the electrode pattern 235 are formed by transparent electrodes made of conductive polymer so that the light is transmitted through the electrode pattern 234 and the electrode pattern 235. In addition, a reflection pattern 237 is provided at the lower part sheet 233 so that the light is reflected in the key top 211 direction.

With this structure, the light emitting from the light emitting diode 218 expands into the lower part sheet 233 functioning as the light guide plate. The light is transmitted through the spacer sheet 232 and the upper part sheet 231. In addition, the light passes through the rubber actuator 214, the gear link part 212, and the housing part 213 made of the transparent and translucent resin having the light transmission capabilities. The light is transmitted through the light transmission area 211b of the key top 211 so as to make the light transmission area 211b brightly luminous.

Thus, in this embodiment, the lower part sheet 233 of the membrane sheet 215 functions as a light guide plate. Therefore, it is not necessary to separately provide the light guide plate. Hence, it is possible to reduce the manufacturing cost of the keyboard 1 and make the keyboard light-weight.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A keyboard comprising:
   light emitting diodes, each of the light emitting diodes configured to emit light;
   light guide plates, each of the light guide plates includes a side surface that receives the light from the light emitting diodes, said each of the light guide plates diffusing the light in a direction along a surface of the light guide plates;
   key tops, each of the key tops has a light transmitting area, through which the light is transmitted, and the key tops are provided over the light guide plates, wherein rows of the key tops are parallelly aligned and columns of the key tops are unevenly aligned;
   gear link parts, each of the gear link parts corresponds to one of said each of the key tops, said each of the gear link parts vertically moves the corresponding key top;
   housing parts, each of the housing parts corresponds to and is provided below one of said each of the key tops, said each of the housing parts holds said each of the gear link parts which corresponds to the corresponding key top;
   rubber actuators, each of the rubber actuators corresponds to one of said each of the key tops and said each of the rubber actuators provides reaction force based on vertical motion of the corresponding key top;
   a membrane sheet which is provided below the rubber actuators, the membrane sheet having contacts, each of the contacts corresponds to one of said each of the key tops and said each of the contacts opens and closes based on the vertical motion of the corresponding key top; and
   a support panel provided below the membrane sheet and provided on the light guide plates, the support panel fixes said each of the gear link parts together with the corresponding housing part,
   wherein the side surface of said each of the light guide plates face each other interposing an area between the light guide plates,
   the light emitting diodes are provided at the area between the facing side surfaces of the light guide plates, said each of the light emitting diodes faces one of said each of the light guide plates to emit the light toward the corresponding light guide plate, and
   each of the facing side surfaces of the light guide plates are formed in a step-shaped configuration having a configuration of spaces between neighboring key tops, and a space between the light guide plates is positioned beneath the spaces between the neighboring key tops.

2. The keyboard as claimed in claim 1,
   wherein one or more of the light emitting diodes positionally correspond to each neighboring key top of the neighboring key tops.

3. The keyboard as claimed in claim 1, further comprising:
   a reflection sheet provided below the light guide plates.

4. The keyboard as claimed in claim 1,
   wherein said each of the key tops has a surface of a transparent or translucent resin through which the light is transmitted, the surface of the transparent or the translucent resin on which a light shading material is coated, the surface of the transparent or the translucent resin having a part where the light shading material is removed by irradiation of laser light so that the light is transmitted.

5. The keyboard as claimed in claim 1, wherein at least one of the key tops is formed by double molding using a transparent or translucent resin through which the light is transmitted and resin through which the light is not transmitted.

6. The keyboard as claimed in claim 1, wherein the gear link parts are made of a transparent or translucent resin through which the light is transmitted.

7. The keyboard as claimed in claim 1, wherein the housing parts are made of a transparent or translucent resin through which the light is transmitted.

8. The keyboard as claimed in claim 1,
   wherein the rubber actuators have elasticity and are made of a transparent or translucent resin.

9. The keyboard as claimed in claim 1,
   wherein the membrane sheet includes an upper part sheet having an electrode and a lower part sheet having another electrode,
   the upper part sheet and the lower part sheet are made of a transparent or translucent resin, and
   the electrode of the upper part sheet and the other electrode of the lower part sheet are transparent.

10. The keyboard as claimed in claim 1,
    wherein the membrane sheet includes
    an upper sheet that includes first contacts, each of the first contacts corresponds to one of said each of the key tops,
    a lower sheet that is provided beneath the upper sheet and includes second contacts, each of the second contacts corresponds to one of said each of the first contacts, and
    a spacer interposed between the upper sheet and the lower sheet, and
    wherein the lower sheet is formed by one of the light guide plates and includes reflection patterns, each of the reflection patterns corresponds to and is provided beneath said each of the key tops and reflects the light toward the corresponding key top.

* * * * *